Aug. 2, 1960  H. W. FAEBER  2,947,234
PHOTOGRAPHIC EXPOSING APPARATUS
Filed May 28, 1957  5 Sheets-Sheet 1

INVENTOR.
HARRY W. FAEBER
BY
his ATTORNEYS

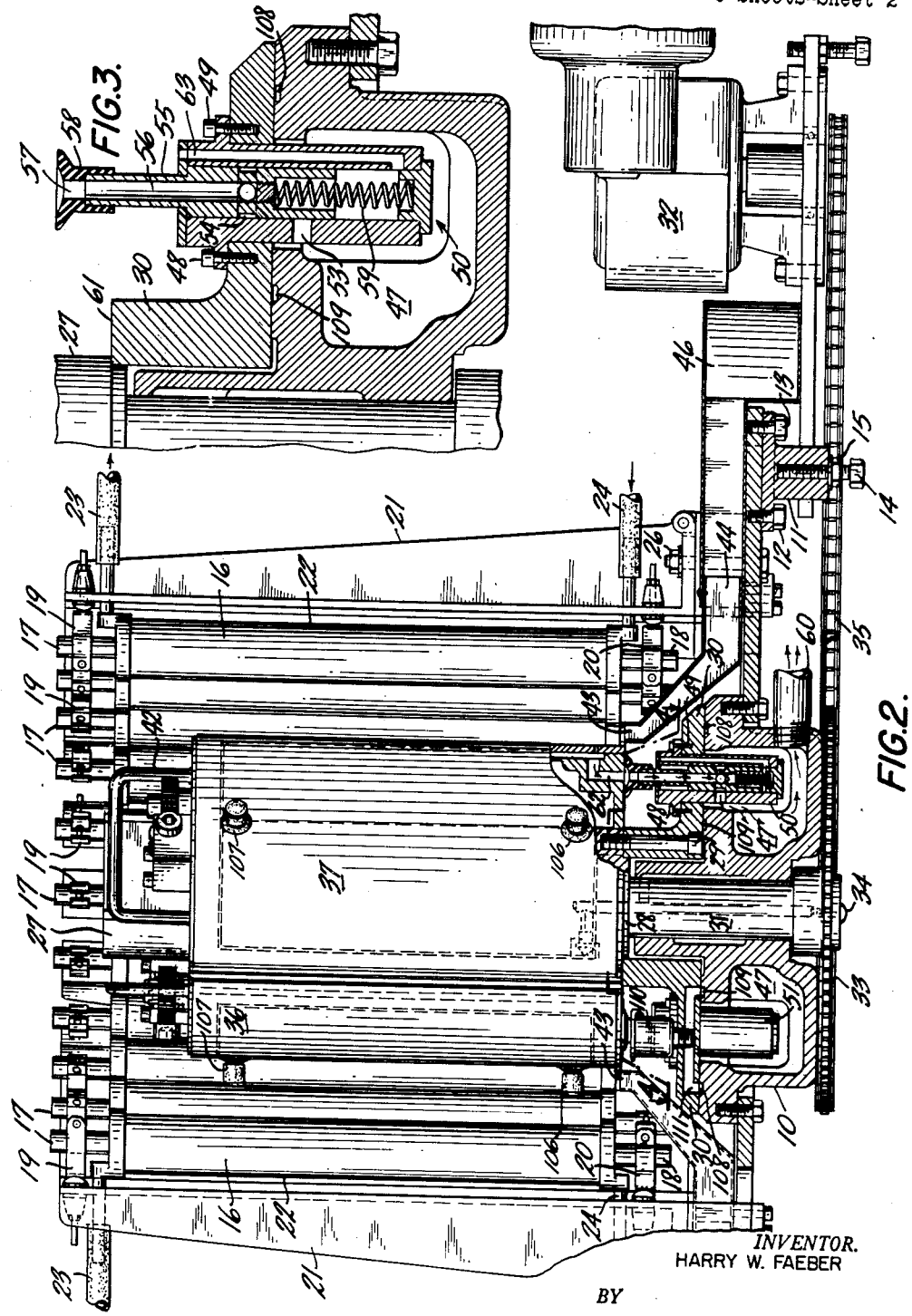

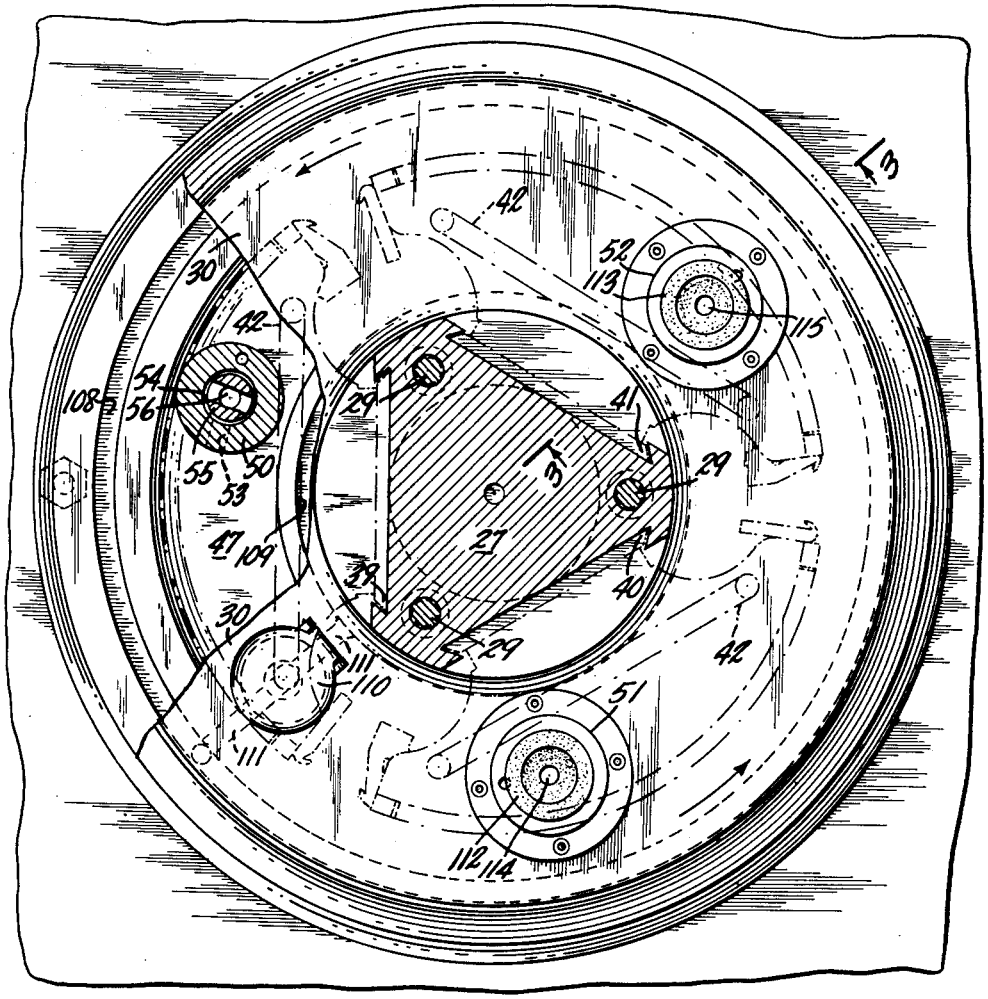

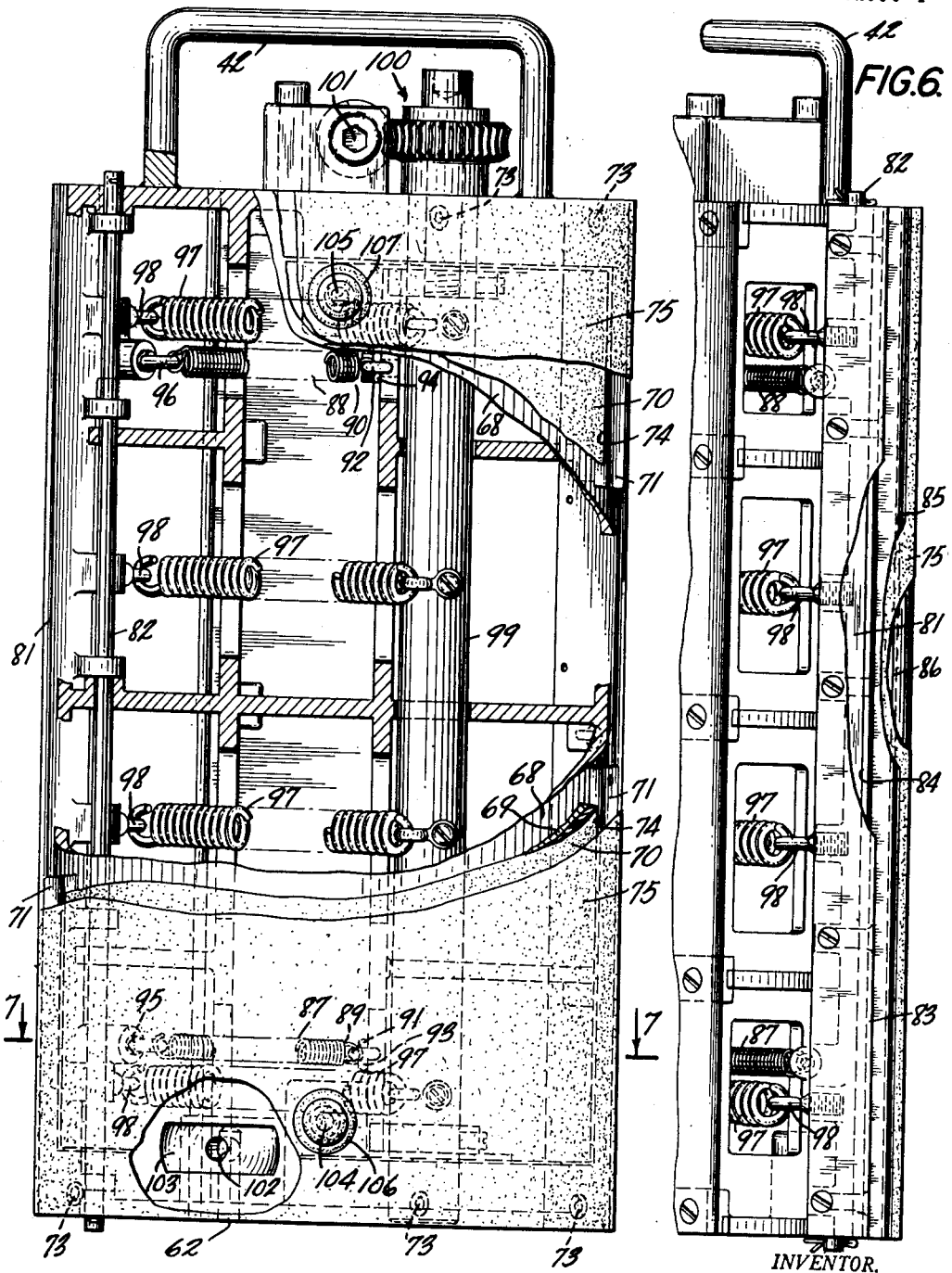

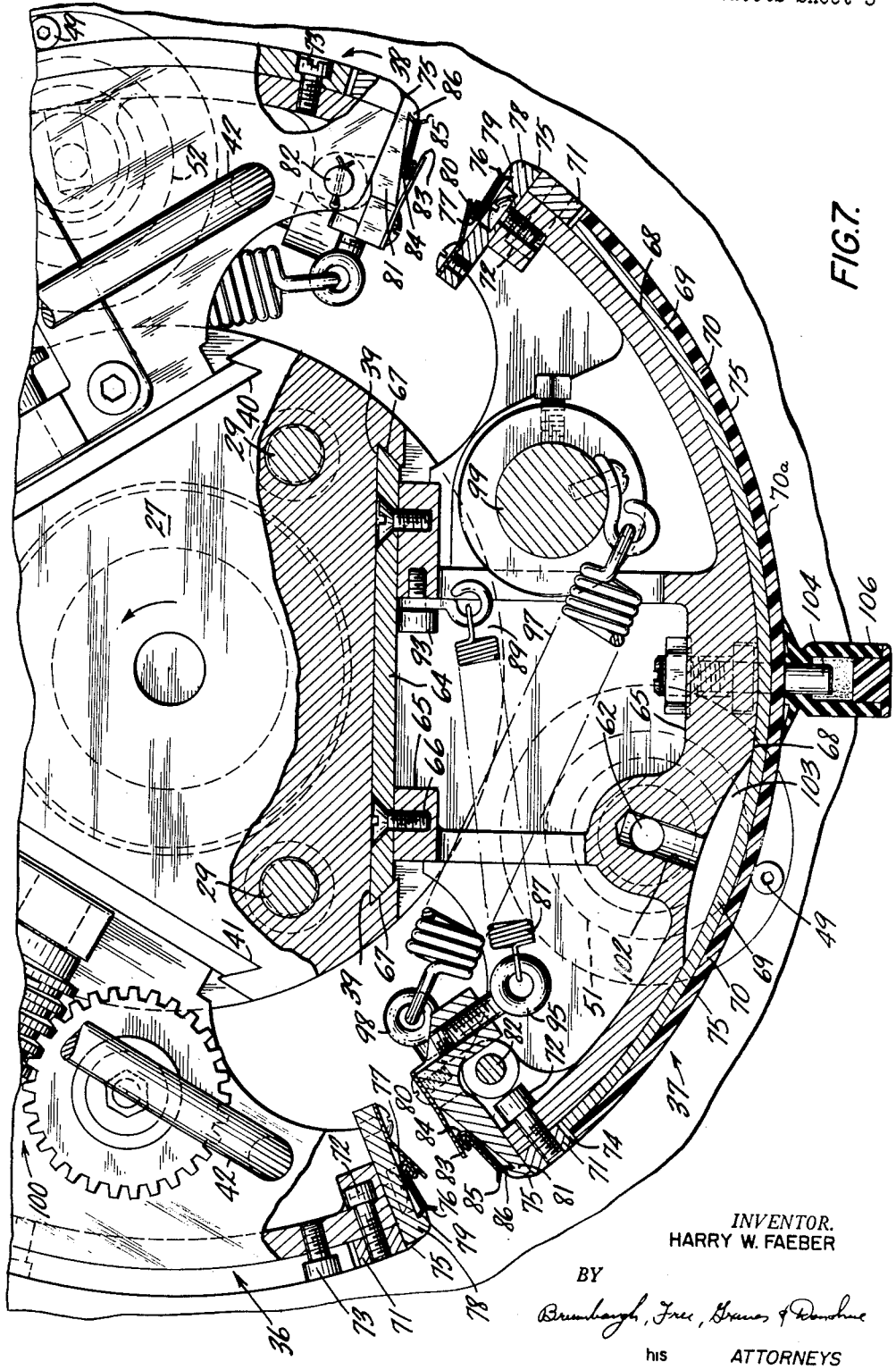

United States Patent Office 2,947,234  
Patented Aug. 2, 1960

2,947,234

PHOTOGRAPHIC EXPOSING APPARATUS

Harry W. Faeber, Larchmont, N.Y., assignor to Time, Incorporated, New York, N.Y., a corporation of New York Filed May 28, 1957, Ser. No. 662,083

11 Claims. (Cl. 95—76)

This invention relates to improvements in photographic printing apparatus.

One of the objects of the invention is to provide a machine in which a photographic printing unit such as a negative and a sensitized surface will be mechanically carried to a light zone, exposed to light in said zone for a measured period of time, and then carried from said light zone to be removed from the machine.

Another object of the invention is to provide a machine of the type stated in which all portions of the negative will be subjected to precisely the same degree of light intensity during exposure.

Still another object of the invention is to provide a printing apparatus with a vacuum system which removes all air between the negative and the printing surface to provide perfect overall contact in a minimum period of time in advance of the printing operation.

It is a further object of the invention to provide a machine of the type stated which is so simple in operation that there is virtually no possibility of error due to faulty manipulation on the part of the operator.

It is also an object of the invention to provide a single vacuum system common to all of a plurality of negative holders whereby one holder may be removed from the common system without destroying the vacuum to the other negative holders.

An additional object of the invention is to provide an improved holder for a negative and a sensitized surface or plate in which a controlled tension may be applied to a flexible, transparent sheet across the negative and the sensitized surface or plate whereupon a vacuum may be created between the negative and the sensitized surface.

Generally, the invention provides a plurality of separate light sources disposed in an arcuate array with a mounting post located substantially at the center of the array. A plurality of negative holders is mounted on the mounting post and rotated past the light sources to expose a photosensitive surface or plate through a negative. As one holder passes into a position away from the light source, it is removed from the mounting post, the negative and exposed plate are replaced with a negative and unexposed plate and the holder is remounted on the mounting post in time to maintain continuous operation of the apparatus.

A vacuum system is connected to each holder to assure that the negative is in close contact with the photosensitive surface. Since the holders are removed individually during the operation cycle, a valve arrangement is provided such that all of the holders may utilize the same vacuum system. As one holder is removed from the apparatus, a valve stem or plunger in the valve arrangement moves upwardly due to the action of a spring. With the plunger in its upward position, the vacuum system is no longer in communication with an inlet aperture of the plunger. Thus, the vacuum system is maintained for the other negative holders.

The face of each holder is provided with a recessed space into which a photosensitive plate or other surface is placed, and a photograph negative is placed on the plate. Then, a flexible, transparent sheet of suitable substance, such as plastic, is placed over the entire surface so that a vacuum may be drawn within the space occupied by the plate and the negative.

To attach the flexible transparent sheet to the holder, a clip bar is squeezed or attached in any suitable manner onto two opposite edges of the sheet. One clip bar is held by a stationary hook on one side of the holder while the other clip bar is held by a rotatable hook on the opposite side of the holder. A controlled tension is applied to the sheet by a pull on the rotatable hook with a spring.

The invention further resides in certain novel features of parts, and further objects and advantages thereof will become apparent to those skilled in the art to which it pertains from the following description of the present preferred embodiment thereof described with respect to the accompanying drawings in which similar reference characters represent corresponding parts in the several views, in which:

Figure 2 is a side view partially in section taken along the line 2—2 in Figure 1 illustrating the drive means to rotate the mounting post and showing the connection of one negative holder to the common vacuum system;

Figure 3 is a sectional view taken along the line 3—3 in Figure 4 of the valve arrangement to permit the connection of one negative holder to the common vacuum system;

Figure 4 is a plan view partially in section taken along the line 4—4 in Figure 2 with the negative holders removed to show the location of the vacuum valve arrangement;

Figure 5 is a side view partially in section of one negative holder;

Figure 6 is a side view of the negative holder shown in Figure 5;

Figure 7 is a cross-sectional view taken along the line 7—7 in Figure 5; and

Figure 8 is a plan view of one end of one of the negative holders showing the attachment of the transparent sheet.

Figure 1:
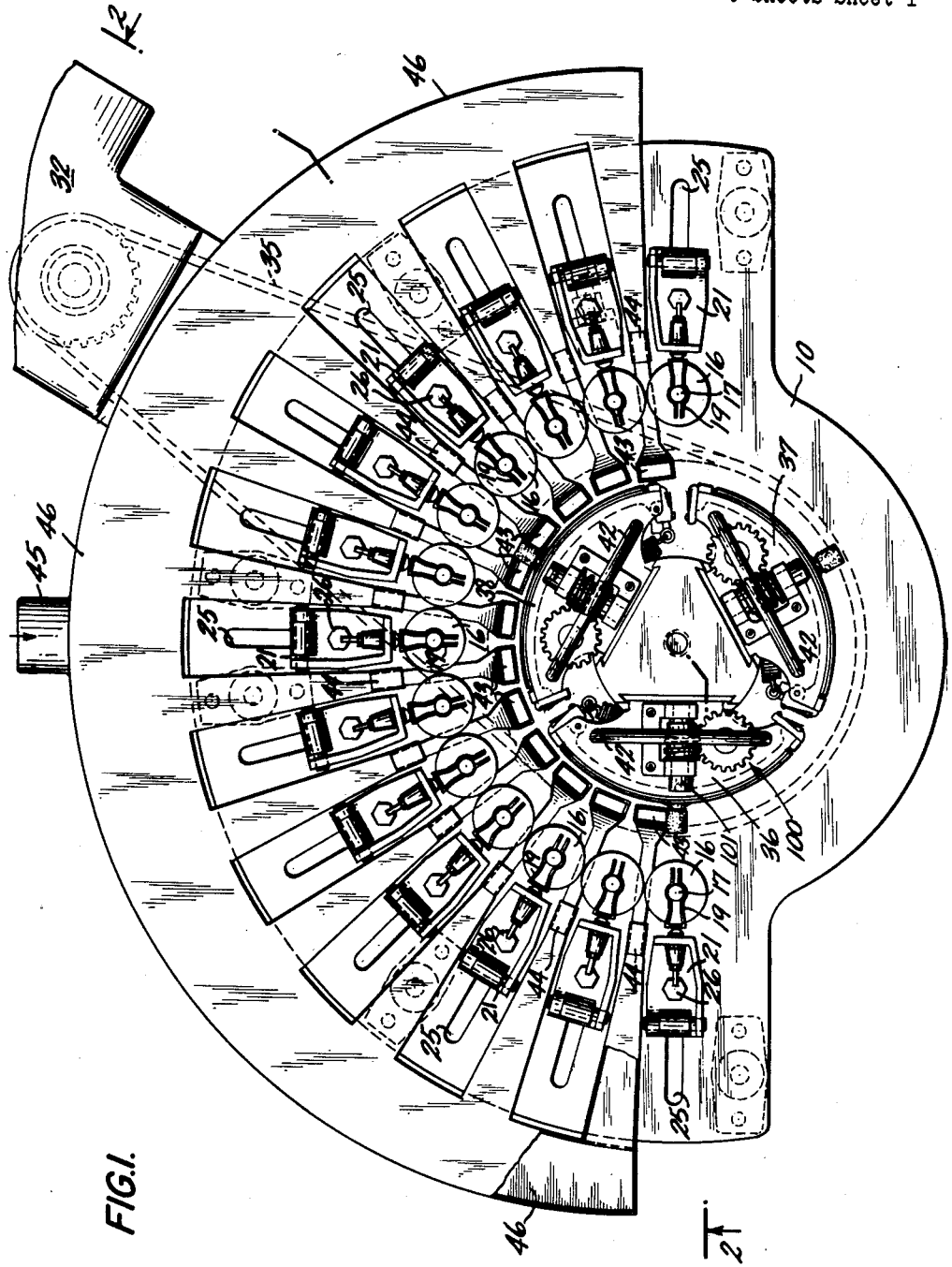
Figure 1 shows a plan view of the apparatus illustrating a plurality of light sources in an arcuate array and the centrally located mounting post with three negative holders in place.

In carrying out the invention, the apparatus is provided with a base 10 of metal or other suitable material which is structurally rigid. Support for the base 10 is provided by a plurality of downwardly depending leg members 11 which are secured to the underside of the base 10 by threaded bolts 12 and 13. The length of each of the leg members 11 is adjustable by an elongated bolt 14 threaded into each leg 11. A lock nut 15 on each of the threaded bolts 14 secures each bolt at the desired length.

Positioned on the base 10 in an arcuate array is a plurality of high intensity light sources 16 to provide the illumination required during the exposure cycle. Each of the light sources 16 is equipped with an electrical connection 17 and 18 at the upper and lower ends, respectively, which is snapped into an upper and lower spring terminal 19 and 20, respectively, on the light source support member 21. Also, each of the light sources 16 is generally provided with a water jacket 22 along its entire length for the circulation of cooling water to eliminate the high intensity of heat which is generated during the operation of the lights. Connections 23 and 24 are positioned at the upper and lower ends, respectively, of the cooling jacket for the circulation of the cooling water (Fig. 2).

Since it is generally required that the plates to be exposed are subjected to the same light intensity during the period they are rotating in front of the light sources 16, each of the light source supports 21 is separately adjustable in position along a slot 25 for each support 21 in the base 10. The position of each light source 16 is adjusted by loosening the nut 26 and moving the support 21 along the slot 25 to the desired position and then retightening the nut 26.

Located at the center of the arc in which the light sources 16 are positioned is a rotatable mounting post 27. The lower end 28 (Fig. 2) of the mounting post 27 is integrally formed by means of threaded bolts 29 or the like with a substantially circular platen 30 which supports the mounting post 27 on the base 10. A centrally disposed, downwardly depending shaft 31 extends through the base 10 to connect with the driving source 32 which rotates the mounting post 27. A sprocket 33 or other suitable gear is secured to the lower end of the downwardly depending shaft 31 by means of a threaded bolt 34 or any other suitable means. The shaft 31 is rotated by means of a chain 35 connected between the sprocket 33 and a suitable power source such as an electric motor 32.

Shown positioned on the mounting post 27 (Figs. 1 and 7) are three negative holders 36, 37 and 38 although it is understood that the invention is not limited to that number. The mounting post 27 is approximately triangular in shape to present three sides on each of which sides is mounted one negative holder. Dove-tail slots 39, 40 and 41 (Fig. 4) are formed on the mounting post 27 into any one of which each negative holder 36, 37 or 38 is slidable vertically. For the purpose of raising each of the negative holders 36, 37 and 38 from the dove-tail slots 39, 40 and 41 on the mounting post 27, a handle 42 is provided at the upper end of each negative holder by which means it may be removed from the mounting post 27 and transported to a suitable work space (not shown) where the negative and exposed plate is removed and a negative and unexposed plate is substituted.

In some instances the surface of each negative holder is heated to excess due to the close proximity of the plurality of light sources 16. Therefore, a series of air jets 43 direct an air blast upwardly along the surface of the negative holders. To accommodate negative holders of different diameters or different radius of curvatures, each of the air jets 43 is adjustable in position by a coupling 44 which permits the adjustment of each jet 43 closer to the negative holder surface or further therefrom. Cooling air is supplied at a single input 45 (Fig. 1) to a manifold 46 which supplies all of the air jets together.

Each of the negative holders 36, 37 and 38 is automatically connected to a common vacuum system upon being lowered into a dove-tail groove 39, 40 or 41 of the mounting post 27. Referring now particularly to Figure 2, a substantially circular channel 47 is provided in the base 10 about the lower support of the mounting post 27. Attached to the revolving platen 30 by suitable threaded bolts 48 and 49 and depending downwardly therefrom into the substantially circular channel 47 are valve housings 50, 51 and 52.

An aperture 53 in the wall of each valve housing, as shown in the housing 50 (Fig. 3), permits access through a circular groove 54 about the valve stem 55 to an aperture 56 extending upwardly through the valve stem 55 and terminating in an opening 57 in a suction cup 58. The valve stem 55 is normally urged in an upwardly direction by a coil compression spring 59, and in such upward position the circular groove 54 communicating with the central aperture 56 of the valve stem 55 is out-of-communication with the aperture 53 in the wall of the valve housing 50. Thus, the valve is normally in a cut-off position. A vacuum is maintained within the circular channel 47 by means of suitable tubular connections 60 (Fig. 2) to a conventional vacuum pump (not shown).

One valve housing is positioned for connection to each of the negative holders such that as a negative holder is lowered into a dove-tail slot, for example slot 39 (Fig. 4), on the mounting post 27 and comes to rest bearing against a shoulder 61 (Fig. 3) on the lower platen 30, the suction cup 58 is in open communication with an aperture 62 (Figs. 2 and 5) in the lower end of the negative holder. As the negative holder is lowered, the valve stem 55 (Fig. 3) is pressed downwardly moving the central aperture 56 and groove 54 of the valve stem 55 into open communication with the aperture 53 in the valve housing 50, thereby connecting the negative holder to the vacuum system. A discharge channel 63 is provided in the side of the valve housing 50 such that the back pressure created by pressing the valve stem 55 downwardly into the valve housing 50 will be relieved.

Two grooves 108 and 109 (Figs. 2 and 4) are formed in the base 10 around the lower support platen 30 of the mounting post 27 on each side of the vacuum channel 47 to provide oil seals for the support of the lower platen 30 and, also, as seals for the vacuum system. Oil is supplied from an oil cup 110 through an aperture 111 (Fig. 2) communicating with each of the oil seals 108 and 109.

Figure 4, partially in cross-section taken along the line 4—4 in Figure 2, shows the relative location of the three valve housings 50, 51 and 52 for the vacuum system. The cut-away portion of Figure 4 shows the relative location of the two oil seal grooves 108 and 109 and the vacuum channel 47 in which is shown the valve housing 50. This plan view (Fig. 4), in section, of the valve housing 50 reveals the valve stem 55, the annular groove 54 in the valve stem 55, the vertically extending aperture 56 in the valve stem 55, and the aperture 53 in the housing 50 of the valve to communicate with the vacuum channel 47.

The other two valve housings 51 and 52 in Figure 4 are shown in plan view taken above the lower platen 30 showing the suction cups 112 and 113, respectively, with the vertically extending apertures 114 and 115 therethrough. Also, in Figure 4, the mounting post 27 being taken in section clearly shows the relative location of the dove-tail slots 39, 40 and 41 into each of which is guided a negative holder. The three threaded bolts, each indicated generally by the numeral 29, serve to attach the mounting post 27 integrally with the lower platen 30, as also shown in Figure 2.

The removable negative holder 37 (Figs. 1 and 2) is shown in further detail in Figs. 5, 6, 7 and 8. In Fig. 7, the negative holder 37 and a portion of the mounting post 27 are shown in section taken along the line 7—7 in Fig. 5. Referring now to Figure 7, the rotatable central mounting post 27 is shown with three dove-tail grooves 39, 40 and 41 extending vertically in the three sides thereof. The removable negative holder 37, in section, shows a plate 64 secured to the holder body 65 by threaded bolts 66 which are recessed in the plate 64. This permits the replacement of this plate as the edges 67 become worn from repeated mounting of the holder in the dove-tail grooves.

The body 65 of the negative holder 37 is formed of suitable metal to provide structural rigidity and presents a curved face 68 against which is placed a composite plate which is formed of a backing plate 69 and a photosensitized layer 70. It is this layer 70 which is to be exposed through a negative 70a placed against the surface of the photosensitized layer 70. Metal stripping 71 is positioned about the edges of the face 68 and attached thereto by bolts 72 threaded from the underside of the face 68 along the two opposite straight edges and by the bolts 73 threaded from the top of the stripping 71 along the opposite curved edges (Fig. 5) to provide a "picture frame" recessed area.

Within this "picture frame" area is placed the composite plate 69—70 and the negative 70a through which the photosensitized layer 70 will be exposed. The area of the "picture frame" space is dimensioned so that a space 74 is provided around the composite plate 69—70 and the negative 70a to permit the attachment of a vacuum as will be described presently. After the composite plate 69—70 and negative 70a have been placed in position, a flexible transparent sheet 75 of suitable substance, such as for example plastic, is placed over the surface to provide a seal.

For attaching the flexible sheet 75 to the holder, a strip of relatively rigid material is folded about two opposite sides of the sheet 75 and squeezed thereagainst. The edges of this strip are flared to form a clip hook 76 (Fig. 7). To assure that the flexible sheet 75 will not pull out of the clip hook 76, the end thereof is bent back, as shown by the bend 77, and pressed to tightly grip the sheet 75. The flexible transparent sheet 75 is attached to the holder by hooking one side of the sheet over a stationary bar 78 (Fig. 7) running along one side of the holder and having a groove 79 along the underside thereof. With this hook 76 in place, it is prevented from slipping by a leaf spring 80 bearing against the bent-back end 77 thereof.

With this side of the sheet 75 attached to the stationary bar 78, the opposite side is attached to a similar bar 81 (Figs. 7 and 8) on the opposite side of the holder 37. However, this opposite bar 81 is rotatable about an axis 82 in order that tension may be applied to the flexible sheet 75. A leaf spring 83, similar to the leaf spring 80, prevents the end 84 of the hook 85 from being detached from the groove 86 in the rotatable bar 81.

The rotatable bar 81 is maintained in the position shown in Figure 7 by two coil tension springs 87 and 88 (Figs. 5 and 6) attached at the ends 89 and 90, respectively, to the body 65 of the holder 37 by eyelets 91 and 92, respectively, mounted on the holder by threaded bolts 93 and 94, respectively, and attached at the opposite ends to threaded eyelets 95 and 96, respectively. The tension of these springs 87 and 88 causes the rotatable bar 81 to be rotated in a counterclockwise direction and, therefore, maintain in its position against the side of the holder face.

After the flexible sheet 75 has been hooked at both sides of the face, tension is applied to the series of springs 97 attached at the second series of eyelets 98 on the rotatable bar 81 in order to cause rotation of the rotatable bar 81 in a clockwise direction, thereby applying tension to the sheet 75.

This series of tensioning springs 97 is shown more clearly in Figures 5 and 6 as being attached to the series of eyelets 98 on the rotatable bar 81 at one end and to a rotatable shaft 99 at the opposite end. Tension is applied to this series of springs 97 by rotating the tensioning shaft 99 through a gear transmission arrangement indicated generally by the numeral 100 (Fig. 5) at one end thereof. A handle (not shown) is inserted into a socket 101 at the upper end of the holder such that as the handle is rotated, motion is transmitted through the gear arrangement 100 to rotate the tension shaft 99.

At the lower end of the negative holder, Figure 5, an aperture 62 extends upwardly to intersect with another aperture 102 communicating with the space within the "picture frame." The first aperture 62 communicates with the suction cup 58 on the valve stem 55 (Fig. 3) as the holder is lowered within the dove-tail grooves 39 of the mounting post 27 (Fig. 4). The second aperture 102 extending from the first aperture 62 terminates in a shallow recess 103 in the face 68 of the holder 37. The shape of this recess 103 may be circular, oval, or an elongated slot as shown in the drawings.

Two positioning pins 104 and 105 (Figs. 5 and 7) extend from the surface of the holder face 68 in order to position the composite plate 69—70 and the negative 70a within the "picture frame." In order to form a seal about the aperture in the sheet 75 through which the positioning pins 104 and 105 extend, suction cups knobs 106 and 107 are inserted over the positioning pins 104 and 105, respectively, after the assembly is completed. These suction cup knobs 106 and 107 are also convenient for removing the negative 70a and the composite plate 69—70 from the "picture frame."

The invention has been shown by way of example only and many modifications and variations may be made therein without departing from the spirit of the invention. Therefore, it is understood that the invention is not to be limited to any specific form or embodiment except insofar as each limitation is set forth in the claims.

I claim:

1. In photographic printing apparatus, the combination comprising a base, a source of light, a mounting means rotatably disposed on said base, power means to rotate said mounting means, a removable negative and sensitized surface holder mounted on said mounting means to revolve before said light source thereby exposing a sensitized surface through a negative, a vacuum means, and means to communicate said vacuum means to said holder to cause close contact between said negative and said sensitized surface when said holder is mounted on said mounting means, said last-mentioned means being adapted to seal said vacuum means when said holder is removed from said mounting means.

2. In photographic printing apparatus, the combination comprising a base, a plurality of adjustable leg members supporting said base, a plurality of water-cooled light sources disposed in an arcuate array on said base, adjustable mounting means for each of said light sources to locate said light sources in a predetermined position on said base, a mounting means rotatably disposed on said base substantially at the center of said light source array, a removable negative and sensitized surface holder mounted on said mounting means to revolve before said light sources thereby exposing a sensitized surface through a negative, vacuum means connected to said negative and sensitized surface holder to maintain said negative and sensitized surface in close contact, valve means positioned intermediate said vacuum means and said holder to close off the vacuum automatically when said holder is removed, and adjustable forced air cooling means to prevent excessive heating of said negative and sensitized surface holder.

3. A photographic printing apparatus, the combination comprising a base, a plurality of light sources disposed in an arcuate array on said base, adjustable mounting means for each of said light sources to locate said light sources in a predetermined position on said base, a mounting means rotatably disposed on said base substantially at the center of said arcuate light source array, power means to rotate said mounting means, a plurality of removable negative and sensitized surface holders mounted on said mounting means to revolve before said light sources thereby exposing sensitized surfaces held by said holders, a plurality of stop means on said rotatable mounting means to support each of said plurality of holders in a predetermined position, a single vacuum source associaed with said base, and vacuum connection means to automatically communicate said vacuum with each of said holders as each holder is mounted on said rotatable mounting means.

4. In photographic printing apparatus, the combination comprising a base, a plurality of light sources disposed in an arcuate array on said base, a rotatable mounting means on said base substantially at the center of said arcuate array, a substantailly circular platen on said mounting means adjacent said base, a channel in said base the open side thereof being sealed by said platen to form a vacuum container, a plurality of valve housing means disposed about said platen in communication with said channel, a plurality of removable negative and sensitized surface holders mounted on said mounting means to revolve before said light sources thereby exposing sensitized surfaces held by said holders, and connection means to automatically communicate each of said holders to said vacuum channel as each holder is mounted on said mounting means.

5. In photographic printing apparatus, the combination comprising a base, a plurality of light sources disposed in an arcuate array on said base, a rotatable mounting means on said base substantially at the center of said arcuate array, a plurality of removable negative and sensitized surface holders mounted on said mounting means to revolve before said light sources thereby exposing sensitized surfaces held by said holders, a single vacuum system associated with said base, and valve means on said base to automatically communicate said vacuum to each of said holders as each holder is mounted on said mounting means.

6. In photographic printing apparatus, the combination comprising a base, a plurality of light sources disposed in an arcuate array on said base, a rotatable mounting means on said base substantially at the center of said array, a plurality of removable negative and sensitized surface holders mounted on said mounting means to revolve before said light sources thereby exposing sensitized surfaces held by said holders, handle means on each of said holders for removing said holders from said mounting means, each of said holders having a curved face portion against which said negative and sensitized surface is attached to maintain constant a predetermined distance between said plurality of light sources and said holder face, and each of said holders having an aperture communicating said face with a common vacuum system as each holder is mounted on said mounting means.

7. In photographic printing apparatus, the combination comprising a base, a plurality of light sources disposed in an arcuate array on said base, adjustable mounting means for each of said light sources to locate each of said light sources in a predetermined position on said base, a rotatable mounting means on said base substantially at the center of said arcuate array, power means to rotate said mounting means, a substantially circular platen on said mounting means adjacent said base, a channel in said base the open side thereof being sealed by said platen, a plurality of valve housing means on said platen in open communication with said channel, valve stem means within each of said valve housing means, spring means in each of said valve housing means to urge said valve stem means to a normally closed position, exhaust aperture means in each of said valve housing means to relieve back pressure as said valve stem means is depressed against said spring means, a vacuum source means connected to said channel in said base, a plurality of removable negative and sensitized surface holders mounted on said mounting means to revolve before said light sources thereby exposing sensitized surfaces held by said holders, and connection means for automatically applying said vacuum to said holder as each holder is mounted on said mounting means.

8. In photographic printing apparatus, the combination comprising a base, a plurality of light sources on said base disposed in an arcuate array, a rotatable mounting means on said base substantially at the center of said arcuate array, a substantially circular platen on said rotatable mounting means adjacent said base, a channel in said base, the open side thereof being sealed by said platen, a plurality of valve housing means on said platen in open communication with said channel, valve stem means in each of said valve housing means having an axially disposed aperture for communication with said channel, spring means associated with each of said valve stem means to urge said valve stem means to a position such that said aperture in said valve stem means is out-of-communication with said channel, each of said valve housing means having an exhaust aperture to relieve the back pressure as said valve stem means is moved into open communication with said channel, a vacuum source means, connection means to said channel in said base for connection to said vacuum source means, a plurality of removable negative and sensitized surface holders mounted on said mounting means to revolve before said light sources thereby exposing sensitized surfaces held by said holders, stop means on said mounting means to locate each of said holders in a predetermined position, and each holder having an aperture therein to automatically connect each of said holders in communication with said vacuum.

9. In photographic printing apparatus, the combination comprising a base, a plurality of light sources disposed in an arcuate array on said base, adjustable mounting means for said light sources to locate each of said light sources in a predetermined position on said base, a rotatable mounting means on said base substantially at the center of said arcuate array, a plurality of removable negative and sensitized surface holders mounted on said mounting means to revolve before said light sources thereby exposing sensitized surfaces held by said holders, a single vacuum source means, connection means to automatically connect each holder to said vacuum source means as each holder is mounted on said mounting means, each of said holders including a handle means, a curved face, a pin depending from said face to position said negative and sensitized surface against said face, a fixed hook means on one side of said face, a pivotal hook means on the opposite side of said curved face for attaching a flexible transparent sheet to hold said negative and sensitized surface against said curved face, spring means to pivot said pivotal hook, and gear means to apply tension in said spring means.

10. A holder device for use with photographic printing apparatus comprising a handle means, curved face means, a pin on said curved face means for positioning a negative and sensitized surface thereon, stationary hook means on one side of said curved face means, pivotable hook means on the opposite side of said curved face means from said stationary hook means to attach a transparent flexible sheet therebetween, first spring means to urge said pivotable hook to apply tension to said flexible transparent sheet, gear means to develop tension in said first spring means, second spring means to return said pivotable hook to relieve tension in said transparent flexible sheet, and said curved face having an aperture therein to communicate said space between said curved face and said flexible transparent sheet with a vacuum source.

11. In a photographic printing apparatus which comprises a base, a source of light, a mounting means disposed on said base, power means to cause relative motion between said light source and said mounting means, a removable negative and sensitized surface holder mounted on said mounting means so that a sensitized surface is exposed by said light source, a vacuum means, and valve means to communicate said vacuum means to said holder to cause close contact between said negative and said sensitized surface when said holder is mounted on said mounting means, said valve means being adapted to seal said vacuum means when said holder is removed.

References Cited in the file of this patent

UNITED STATES PATENTS

| | | |
|---|---|---|
| 601,883 | Schwarz | Apr. 5, 1898 |
| 865,797 | Palmer | Sept. 10, 1907 |
| 1,871,484 | Uyttenbroeck | Aug. 16, 1932 |